(12) United States Patent
Spratte et al.

(10) Patent No.: US 7,695,212 B2
(45) Date of Patent: Apr. 13, 2010

(54) BALL AND SOCKET JOINT FOR A MOTOR VEHICLE

(75) Inventors: Joachim Spratte, Osnabrueck (DE); Metin Ersoy, Walluf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 293 days.

(21) Appl. No.: 11/573,735

(22) PCT Filed: Aug. 2, 2005

(86) PCT No.: PCT/DE2005/001357
§ 371 (c)(1),
(2), (4) Date: Feb. 15, 2007

(87) PCT Pub. No.: WO2006/018001
PCT Pub. Date: Feb. 23, 2006

(65) Prior Publication Data
US 2007/0253763 A1  Nov. 1, 2007

(30) Foreign Application Priority Data
Aug. 16, 2004  (DE)  ........... 10 2004 039 781

(51) Int. Cl.
*F16C 11/06* (2006.01)
*G01B 7/04* (2006.01)
*G01B 7/30* (2006.01)
*B60G 7/00* (2006.01)
(52) U.S. Cl. ........... 403/135; 403/122; 403/134; 324/207.25; 702/34; 702/38
(58) Field of Classification Search ........... 403/50, 403/122, 133–135, 76; 324/207.25; 345/161; 338/128; 702/34, 38
See application file for complete search history.

(56) References Cited

U.S. PATENT DOCUMENTS

| 4,488,763 | A | * | 12/1984 | Ritter |
| 4,500,867 | A | * | 2/1985 | Ishitobi et al. ........ 338/128 |
| 4,719,381 | A | * | 1/1988 | Miles |
| 4,733,214 | A | * | 3/1988 | Andresen ............ 338/128 |
| 4,986,689 | A | * | 1/1991 | Drutchas ............ 403/135 |
| 5,712,478 | A | * | 1/1998 | Olsson |
| 5,969,520 | A | * | 10/1999 | Schottler |
| 6,501,458 | B2 | * | 12/2002 | Baker et al. |

(Continued)

FOREIGN PATENT DOCUMENTS

DE        37 38 753 C1    6/1989

(Continued)

*Primary Examiner*—Daniel P Stodola
*Assistant Examiner*—Ernesto Garcia
(74) *Attorney, Agent, or Firm*—McGlew and Tuttle, P.C.

(57) ABSTRACT

A ball and socket joint for a motor vehicle, with a housing (4) having a wall (7), a bottom (8) and an opening (9), with a ball pivot (3), which has a joint ball (1) and a pivot (2). The ball pivot is mounted with the joint ball (1) rotatably and pivotably in the housing (4) and the pivot extends out of the housing (4) through the opening (9). An electronic component (14) is arranged in the housing (4). An electrically conductive connection (17) is arranged in the housing (4) and is electrically connected to the component (14). The electrically conductive connection (17) extends out of the housing (4) from the component (14) in the area of the opening (9) or through the opening (9).

17 Claims, 1 Drawing Sheet

U.S. PATENT DOCUMENTS

| | | | |
|---|---|---|---|
| 6,533,491 B1 * | 3/2003 | Redele | 403/138 |
| 6,773,197 B2 * | 8/2004 | Urbach | 403/135 |
| 6,879,240 B2 * | 4/2005 | Kruse | 338/128 |
| 7,063,480 B2 * | 6/2006 | Ersoy et al. | 403/122 |
| 7,090,425 B2 * | 8/2006 | Bohne et al. | 403/122 |
| 7,221,265 B2 * | 5/2007 | Bjorkgard | 403/122 |
| 7,367,742 B2 * | 5/2008 | Brunneke et al. | 403/122 |
| 7,452,155 B2 * | 11/2008 | Brunneke | 403/122 |
| 2009/0136288 A1 * | 5/2009 | Ersoy et al. | 403/76 |

FOREIGN PATENT DOCUMENTS

| | | |
|---|---|---|
| DE | 44 29 856 C1 | 9/1995 |
| DE | 101 10 738 C1 | 11/2002 |
| EP | 0 617 260 A | 9/1994 |
| FR | 2 833 321 | 6/2003 |
| JP | 56006911 * | 1/1981 |
| JP | 63 292001 | 5/1987 |
| JP | 62 292915 | 12/1987 |
| JP | 63 293318 | 11/1988 |
| WO | WO 03/052284 | 6/2003 |
| WO | WO 2005057028 A1 * | 6/2005 |

* cited by examiner

BALL AND SOCKET JOINT FOR A MOTOR VEHICLE

CROSS REFERENCE TO RELATED APPLICATIONS

This application is a United States National Phase application of International Application PCT/DE2005/001357 and claims the benefit of priority under 35 U.S.C. §119 of German Patent Application DE 10 2004 039 781.3 filed Aug. 16, 2004, the entire contents of which are incorporated herein by reference.

FIELD OF THE INVENTION

The present invention pertains to a ball and socket joint for a motor vehicle, with a housing having a wall, a bottom and an opening, with a ball pivot, which has a joint ball and a pivot, is mounted rotatably and pivotably with the joint ball in the housing, and extends out of the housing through the opening, with an electronic component, which is arranged in the housing, and with an electrically conductive connection, which is arranged in the housing and is electrically connected to the component.

BACKGROUND OF THE INVENTION

Control arms are essential components of the chassis, which connect the wheel to the body and comprise a force transmission body made of metal and force-applying points (hinge points) arranged at the ends, the wheel suspension-side connection being usually designed as a ball and socket joint. Level sensors, which send the position of the wheel to the body, are increasingly encountered in modern vehicles. These sensors are usually designed as shaft encoders, which are fastened to the body and are coupled with the control arm via a linkage. There have been considerations for some time to integrate these and other functionalities of the sensor as well as the functionalities of other sensors in the ball and socket joint.

A ball and socket joint is known from EP 0 617 260 A1, wherein a ball pivot is provided with a magnet and is mounted in a ball socket made in one piece with a housing. An insert is connected via a locking mechanism to the housing and sealed against the housing by means of a seal. The insert has a plug type connector, which is connected to a printed circuit board in the housing in an electrically conductive manner. The printed circuit board is arranged on a bracket made in one piece with the insert and carries a magnetic field-sensitive sensor.

If the bottom area of the housing, in which area the sensor is seated, is arranged towards the pavement, there is a risk that the insert or the plug type connector will be damaged by stone chips, dirt or moisture, so that the ability of the sensor, the printed circuit board and/or the plug type connector to function may be compromised by contaminants penetrating via the bottom area.

SUMMARY OF THE INVENTION

Based on this state of the art, the basic object of the present invention is to improve a ball and socket joint of the type described in the introduction such that the possibility of impairment of the component and of the electrical connection by contaminants penetrating via the bottom area can be reduced when the bottom of the ball and socket joint is arranged towards the pavement.

The ball and socket joint according to the present invention for a motor vehicle has a housing with a wall, a bottom and an opening, a ball pivot, which has a joint ball and a pivot and which is mounted rotatably and pivotably with the joint ball in the housing and extends through the opening out of the housing, an electronic component, which is arranged in the housing, and an electrically conductive connection, which is arranged in the housing and which is electrically connected to the component, wherein the electrically conductive connection extends out of the housing beginning from the component in the area of the opening or through the opening.

Due to the fact that the conductive connection is led out in the area of the opening or through the opening of the ball and socket joint according to the present invention, the bottom area of the ball and socket joint can be kept free from ducts for electric lines. Since such ducts also cannot consequently be damaged any longer when stone chips, dirt and moisture act on the bottom, the possibility of damage to the component and the conductive connection due to contaminants penetrating via the bottom area is reduced when the bottom of the ball and socket joint is arranged towards the pavement.

The bottom is preferably a closed bottom and can be rigidly connected to the wall or made in one piece with same. In the case in which the bottom is made in one piece with the wall, seals for sealing the bottom against the wall can be eliminated. It is thus also impossible for such seals to be damaged by stone chips, dirt and moisture, so that another weak point of the bottom area in terms of the penetration of contaminants into the housing is eliminated when the bottom of the ball and socket joint according to the present invention is arranged towards the pavement.

The housing may consist of metal, and the wall and the bottom are manufactured especially from a one-piece sheet metal part. The component can thus be shielded against external electromagnetic interferences, which may be generated, e.g., by units, magnetic brakes of trains located close by or by the natural magnetic field.

When integrating electronic components in ball and socket joints, it proved to be useful to arrange these components in the bottom area of the ball and socket joint. The ball and socket joint according to the present invention is thus preferably designed such that the opening is located opposite the bottom, the component is arranged between the joint ball and the bottom, and the conductive connection extends, at least in some sections, between the joint ball and the wall. The electrically conductive connection may be electrically insulated against the housing in a suitable manner.

To improve the mounting of the joint ball in the housing, a bearing shell or ball shell accommodating the joint ball may be arranged in the housing, the electrically conductive connection preferably extending, at least in some sections, between the bearing shell and the wall. The bearing shell has especially spring elements now, so that the joint ball can be snapped into the bearing shell. Furthermore, a lubricant can be introduced into the housing to improve the sliding properties.

A component bracket, which is arranged in the housing and carries the component, may be connected to the bearing shell. The component is preferably fastened to the component bracket, which may in turn be connected to the bearing shell via snap elements, via a snap connection. Furthermore, the component bracket may act as a protection for the component against direct contact with lubricant introduced into the housing.

A closing element, which surrounds the opening, has especially an S-shaped cross section and has a through opening or through hole, through which the electrically conductive connection extends, may be fastened to the wall. A sealing bellows, which extends from the closing element to the joint pivot, is preferably fastened to the closing element, and the through hole is sealed by the sealing bellows.

The conductive connection is connected to the component, e.g., by soldering, riveting or welding and may have one or more electric lines, especially in the form of a single-wire or multiwire cable. However, the conductive connection is preferably designed as a flexible printed circuit board, which has, e.g., strip conductors embedded in a flexible plastic.

The component may be used to detect a twisting and/or a deflection of the ball pivot in relation to the ball and socket joint housing. A signal transmitter, e.g., a magnet, may be introduced for this purpose into the ball pivot, the component having a sensor, especially a magnetic field sensor. The magnet is preferably introduced in the area of the joint ball facing away from the pivot and is designed especially as a permanent magnet. The wording that the component has a sensor or magnetic field sensor should not be understood to be limiting. In particular, it is also possible that the component is designed as a sensor or magnetic field sensor. However, the sensor proper is usually integrated in a housing in conventional sensor components and is provided with additional circuits, e.g., for temperature compensation, linearization, etc., which do not have a sensor function themselves.

The basic object of the present invention is accomplished, furthermore, by a motor vehicle component with a ball and socket joint fastened in same, which is a ball and socket joint according to the present invention and may be varied according to all the above-described embodiments. The ball and socket joint is seated with its housing, in particular, in a recess of the motor vehicle component, which is, e.g., a control arm, preferably a trailing arm or a transverse link. Furthermore, the ball and socket joint may be held at only one point above the area at risk at connection points.

To enable the component to be connected to an electronic unit arranged outside the ball and socket joint in a simple manner, a plug type connector is connected, especially soldered, at the end of the electric connection led out of the ball and socket joint. This plug type connector is preferably fastened to a motor vehicle component via a snap connection, which extends, e.g., through a hole provided in the motor vehicle component. However, as an alternative, the plug type connector may also be connected to the motor vehicle component via a screw connection or riveting.

The present invention will be described below on the basis of a preferred embodiment with reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
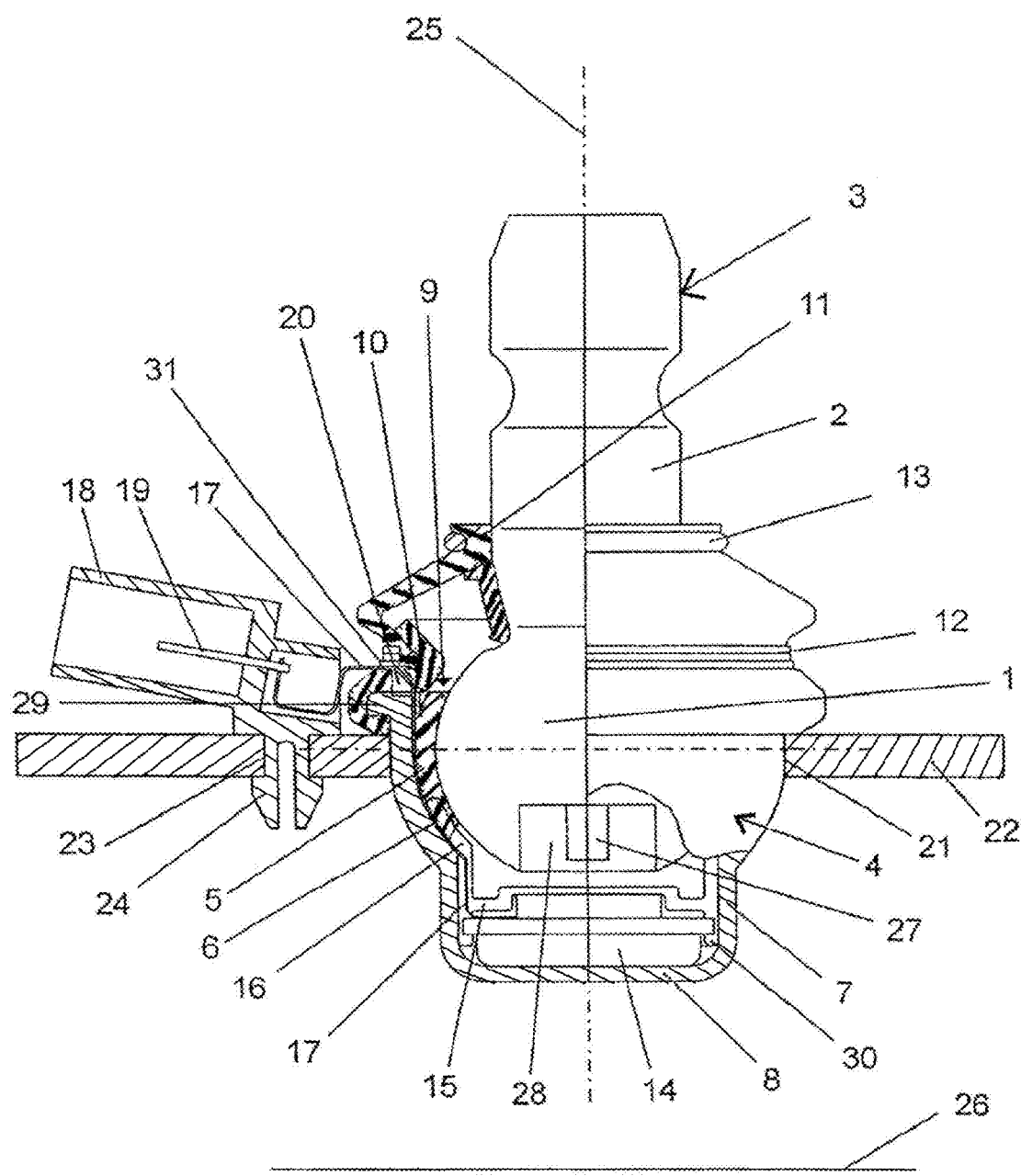
FIG. 1 is a schematic, partly cut-away side view of an embodiment of the ball and socket joint according to the present invention.

Referring to the drawings in particular, FIG. 1 shows a partially cut-away side view of an embodiment of the ball and socket joint according to the present invention, in which a ball pivot 3 having a joint ball 1 and a pivot 2 is mounted with the joint ball 1 rotatably and pivotably in a housing 4. The ball pivot 3 extends with the pivot 2 out of the housing 4 through an opening 9, the joint ball 1 being seated in a bearing shell (or ball shell) 5, which is arranged in the housing 4 and at the lower end of which spring elements 6 are formed. The housing has a wall 7, a bottom 8 and the opening 9, which is located opposite the bottom 8, which is closed and is made in one piece with the wall 7. Thus, the bottom 8 and the opening 9 each form a front side of the body formed from the essentially rotationally symmetrical wall 7. At its end facing the opening 9, the wall 7 has an outer shoulder 29, which extends around the opening 9.

Furthermore, an annular closing element 10, which surrounds the opening 9, has an essentially S-shaped cross section and extends under the outer shoulder 29, is fastened at the end of the wall 7 facing the opening 9. A sealing bellows 11, which extends away from the opening 9 from the closing element 10 and is in contact with the pivot 2 of the ball pivot 3, is fixed at the closing element 10. The sealing bellows 11 is secured by means of a first ring 12 on the housing side and by means of a second ring 13 on the pivot side.

The housing 4 is shown in an enlarged form in the bottom area, and a sensor 14, which is fastened to a component bracket (sensor bracket) 15, is arranged between the joint ball 1 and the bottom 8. The sensor 14 is secured by means of a snap connection 30 at the sensor bracket 15, which is fixed to the bearing shell 5 by means of snap elements 16. The sensor 14 is arranged on the side of the sensor bracket 15 facing away from the joint ball 1, so that this sensor bracket acts as a protection against direct contact between the sensor 14 and a lubricant introduced into the bearing shell 5.

The sensor 14 is electrically connected to a plug type connector 18 arranged outside the housing 4 by means of a flexible printed circuit board 17, and the strip conductors of the flexible printed circuit board 17 are soldered to the contacts of the sensor 14 on the sensor side and the strip conductors of the printed circuit board are soldered to electric contacts 19 of the plug type connector 18 on the side of the plug type connector. The flexible printed circuit board 17 extends out of the housing 4 of the ball and socket joint and to the plug type connector 18, starting from the sensor 14, along the wall 7, through the opening 9 and through a through hole 20 provided in the closing element 10. In the area of the bearing shell 5, the flexible printed circuit board 17 extends between the wall 7 and the bearing shell 5, and the through opening 20 is sealed by an area 31 of the sealing bellows 11 provided between the first ring 12 and the closing element 10.

The housing 4 is sealed with its wall 7 in a recess 21 of a motor vehicle control arm 22, in which a hole 23 is provided at a spaced location from the recess 21, a snap element 24 of the plug type connector 18 extending through the hole 23, as a result of which the plug type connector 18 is fixed at the control arm 22.

As is apparent from FIG. 1, the housing 4 is seated in the recess 21 such that the plug type connector 18, the part of the flexible printed circuit board 17 extending out of the housing 4, the through hole 20 in the closing element 10 and the sealing bellows 11 are arranged above the control arm 22, whereas the bottom 8 is arranged under the control arm 22. The ball and socket joint with its bottom 8 faces a pavement 26 indicated schematically.

Since the bottom 8 is completely closed and is made in one piece with the wall 7, the sensor is protected from stone chips and splash water from the underside of the joint. Furthermore, the plug type connector 18, the part of the flexible printed circuit board 17 extending out of the housing 4 as well as the through hole 20 in the closing element 10 are arranged on the side of the control arm 22 facing away from the pavement 26 and are thus shielded by same against stone chips and splash water from the pavement.

The sensor 14 is a magnetic field-sensitive sensor, which can detect the magnetic field of a permanent magnet 27, which is seated in a depression 28 of the joint ball 1. The longitudinal axis of the ball pivot 3 coincides with the longitudinal axis of 25 of the housing 4 in the non-deflected state of the ball pivot 3. If the ball pivot 3 is deflected in relation to the housing 4, the magnetic field acting on the sensor 14 changes, so that the angle between the longitudinal axis 25 of the housing 4 and the longitudinal axis of the deflected ball pivot 3 can be measured by means of the sensor 14. As an alternative or in addition, twisting of the ball pivot 3 about its longitudinal axis can be determined by the sensor 14.

The assembly of the ball and socket joint will be described below. During the assembly of the ball and socket joint, the ball pivot 3 is first snapped into the bearing shell 5 from below by means of the spring elements 6, which are made in one piece with the bearing shell 5. The sensor bracket 15, into which the sensor 14, on which the flexible printed circuit board 17 is in turn mounted, has already been snapped, is then connected to the bearing shell 5 by means of the snap elements 16. The unit, thus preassembled, is then introduced into the ball and socket joint housing 4. The flexible printed circuit board 17 is then passed through the through hole 20 in the closing element 10, after which the closing element 10 and the sealing bellows 11 are mounted. The plug type connector 18 is now soldered to the flexible printed circuit board 17. The plug type connection 18 is snapped into the control arm 22 after the mounting of the ball and socket joint thus prepared into the control arm 22.

While a specific embodiment of the invention has been shown and described in detail to illustrate the application of the principles of the invention, it will be understood that the invention may be embodied otherwise without departing from such principles.

The invention claimed is:

1. A ball and socket joint for a motor vehicle, the ball and socket joint comprising:
    a housing having a wall, a bottom and an opening;
    a ball pivot including a joint ball and a pivot, said ball pivot being mounted with said joint ball rotatably and pivotably in said housing with said pivot extending through said opening out of said housing;
    an electronic component arranged in said housing;
    a bearing shell arranged in said housing, said bearing shell accommodating said joint ball;
    a component bracket arranged in said housing and carrying said electronic component, said component bracket being fastened to said bearing shell;
    an electrically conductive connection arranged in said housing and electrically connected to said component, said electrically conductive connection extending out of said housing from said component through said opening;
    an annular closing element, which surrounds said opening and which has a through opening, through which said electrically conductive connection extends, said annular closing element being fastened to said wall; and
    a sealing bellows, which extends from said closing element to said pivot and is fastened to said closing element, said through opening of said closing element being sealed by said sealing bellows.

2. A ball and socket joint in accordance with claim 1, wherein said bottom is closed and made in one piece with said wall.

3. A ball and socket joint in accordance with claim 1, wherein said opening is located opposite said bottom, said electronic component is arranged between said joint ball and said bottom, and said conductive connection extends, at least in some sections, between said joint ball and said wall.

4. A ball and socket joint in accordance with claim 1, wherein said electrically conductive connection extends, at least in some sections, between said bearing shell and said wall.

5. A ball and socket joint in accordance with claim 1, wherein said electrically conductive connection is a flexible printed circuit board.

6. A ball and socket joint in accordance with claim 1, further comprising: a magnet arranged in said joint ball, said component having a magnetic field sensor.

7. A ball and socket joint in accordance with claim 1, wherein said ball and socket joint is fastened to a motor vehicle component.

8. A ball and socket joint in accordance with claim 7, wherein said ball and socket joint with said housing is seated in a recess of said motor vehicle component.

9. A ball and socket joint in accordance with claim 7, further comprising: a plug connector connected to the end of said electric connection that is led out of said housing.

10. A ball and socket joint in accordance with claim 9, wherein said plug connector is fastened to said motor vehicle component by a snap connection.

11. A motor vehicle joint, comprising:
    a housing having a bottom closing said housing at one side and a wall defining an opening opposite said bottom;
    a bearing shell disposed in said housing;
    a ball pivot with a pivot and a connected joint ball, said ball pivot being rotatably and pivotably mounted with said joint ball in contact with said bearing shell in said housing with said pivot extending through said opening out of said housing;
    an electronic component arranged in said housing between said joint ball and said bottom; and
    an electrically conductive connection arranged in said housing and electrically connected to said component, said electrically conductive connection extending, at least in some sections, between said joint ball and said wall, and extending out of said housing from said component through said opening.

12. A motor vehicle joint in accordance with claim 11, further comprising: a component bracket arranged in said housing and carrying said component, said component bracket being fastened to said bearing shell.

13. A motor vehicle joint in accordance with claim 11, further comprising:
    an annular closing element, which surrounds said opening and which has a through opening, through which said electrically conductive connection extends, said annular closing element being fastened to said wall; and
    a sealing bellows, which extends from said closing element to said pivot and is fastened to said closing element, said through hole, said closing element being sealed by said sealing bellows.

14. A motor vehicle joint in accordance with claim 11, further comprising: a magnet arranged in said joint ball, said component having a magnetic field sensor.

15. A motor vehicle joint in accordance with claim 11, wherein said electrically conductive connection is a flexible printed circuit board.

16. A motor vehicle joint in accordance with claim 11, further comprising:

a motor vehicle component, said housing being seated in a recess of said motor vehicle component; and a plug connector connected to the end of said electric connection that is led out of said ball and socket joint, wherein said plug connector is fastened to said motor vehicle component by a snap connection.

17. A ball and socket joint for a motor vehicle, the ball and socket joint comprising:

a housing having a wall, a bottom and an opening;

a ball pivot including a joint ball and a pivot, said ball pivot being mounted with said joint ball rotatably and pivotably in said housing with said pivot extending through said opening out of said housing;

an electronic component arranged in said housing;

an electrically conductive connection arranged in said housing and electrically connected to said component said electrically conductive connection extending out of said housing from said component through said opening;

an annular closing element, which surrounds said opening and which has a through opening, through which said electrically conductive connection extends, said annular closing element being fastened to said wall; and a sealing bellows, which extends from said closing element to said pivot and is fastened to said closing element, said through opening of said closing element being sealed by said sealing bellows.

* * * * *